Patented Sept. 27, 1932

1,879,068

UNITED STATES PATENT OFFICE

HUGH MILLS BUNBURY AND WILLIAM JOHNSON SMITH NAUNTON, OF PRESTWICH, MANCHESTER, AND WILFRED ARCHIBALD SEXTON, OF HUDDERSFIELD, ENGLAND, ASSIGNORS TO IMPERIAL CHEMICAL INDUSTRIES LTD., A CORPORATION OF GREAT BRITAIN

VULCANIZATION OF RUBBER

No Drawing. Application filed March 30, 1931, Serial No. 526,548, and in Great Britain April 29, 1930.

This invention relates to new and useful materials valuable in the vulcanization of rubber.

We have found that valuable vulcanization accelerators may be produced by the interaction of alkali salts of mercaptoarylenethiazoles with 1-chloro-2:4-dinitro-naphthalene. We have also found that our new products are particularly valuable when used in conjunction with a basic organic accelerator such as, for example, diphenylguanidine. Our new accelerators, particularly when mixed with a basic organic accelerator, such as diphenylguanidine, possess the highly desirable property of delayed action, that is to say, vulcanization at a low temperature, e. g. 110° C., is very slow, but at a relatively high temperature, e. g. 141° C., proceeds with great rapidity.

Our invention may be exemplified by the following examples, it being understood that the amounts and specific ingredients mentioned in said examples are by way of illustration and not by limitation.

Example 1

167 parts of mercaptobenzothiazole are dissolved in 400 parts of 10% caustic soda solution and an equal volume of methylated spirits. The solution is heated to about 55° C. and stirred while a warm solution of 254 parts 1-chloro-2:4-dinitro-naphthalene in 2300 parts of methylated spirit added. After 20 minutes, the mixture is cooled to 5° C. and the orange coloured product is separated by filtration and dried. The compound is believed to be represented by the formula:—

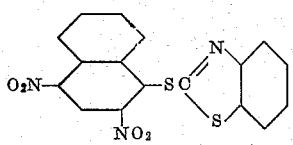

It has a melting point at 144° C.

Example 2

0.5 parts of the product of Example 1 are incorporated into a rubber mix compound of pale crepe rubber 100 parts, zinc oxide 10 parts, barytes 75 parts, sulphur 2.5 parts. Vulcanization for 20 minutes at 141° C. gives a rubber having a tensile strength at break of 37 kg. per sq. cm.

Example 3

0.25 parts of the product of Example 1, together with 0.25 parts of diphenylguanidine are incorporated into a rubber mix of the composition given in Example 2. After being vulcanized at 110° C. for 50 minutes the rubber had a tensile strength at break of only 18 kg. per sq. cm. whereas after being vulcanized at 141° C. for only 20 minutes it had a tensile strength at break of 177 kg. per sq. cm.

Various modifications of our invention may be made without departing from the spirit thereof. In general, the interaction of 1-chloro-2:4-dinitro-naphthalene with an aryl mercapto thiazole, and particularly a soluble salt thereof, such as the alkali metal salt, results in a compound to which we ascribe the following formula:

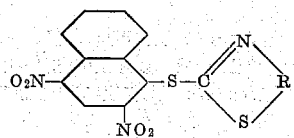

In the above formula R represents an aromatic nucleus which may or may not be substituted. Thus, R may be a benzene ring or a naphthalene ring, and either of these rings may contain substituents such as the alkyl groups. While we have illustrated our invention with the use of diphenylguanidine, it is to be understood that other basic organic accelerators may be employed such as, for example, diorthotolylguanidine and various other basic accelerators now on the market.

Since many embodiments of this invention, differing widely in one or more respects, may be made without departing from the spirit of our invention, it is to be understood that we do not limit ourselves to the foregoing examples or description except as indicated in the following claims:

We claim:

1. A method of treating rubber which comprises adding to the rubber, prior to vulcanization, a compound formed by the reaction of 1-chloro-2:4-dinitro-naphthalene with an aryl mercapto thiazole, and thereafter vulcanizing.

2. A method of treating rubber which comprises adding to the rubber, prior to vulcanization, a compound formed by the reaction of 1-chloro-2:4-dinitro-naphthalene with mercapto benzo thiazole, and thereafter vulcanizing.

3. A method of treating rubber which comprises adding to the rubber, prior to vulcanization, a diarylguanidine accelerator and a compound formed by the reaction of 1-chloro-2:4-dinitro-naphthalene with the sodium salt of mercaptobenzothiazole, and thereafter vulcanizing.

4. A method of treating rubber which comprises adding to the rubber, prior to vulcanization, a diarylguanidine accelerator and a compound having the probable formula:

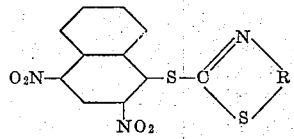

in which R is an aromatic nucleus, and thereafter vulcanizing.

5. Vulcanized rubber produced by the method defined in Claim 1.

6. Vulcanized rubber produced by the method defined in claim 2.

7. Vulcanized rubber produced by the method defined in claim 3.

8. Vulcanized rubber produced by the method defined in claim 4.

In testimony whereof we affix our signatures.

HUGH MILLS BUNBURY.
WILLIAM JOHNSON SMITH NAUNTON.
WILFRED ARCHIBALD SEXTON.